Oct. 23, 1962     P. GANCEL ET AL     3,059,731
DISK BRAKES

Filed July 13, 1959                                        4 Sheets-Sheet 1

INVENTORS
PIERRE GANCEL
ETIENNE SERVIER
BY John A. Young
ATTORNEY

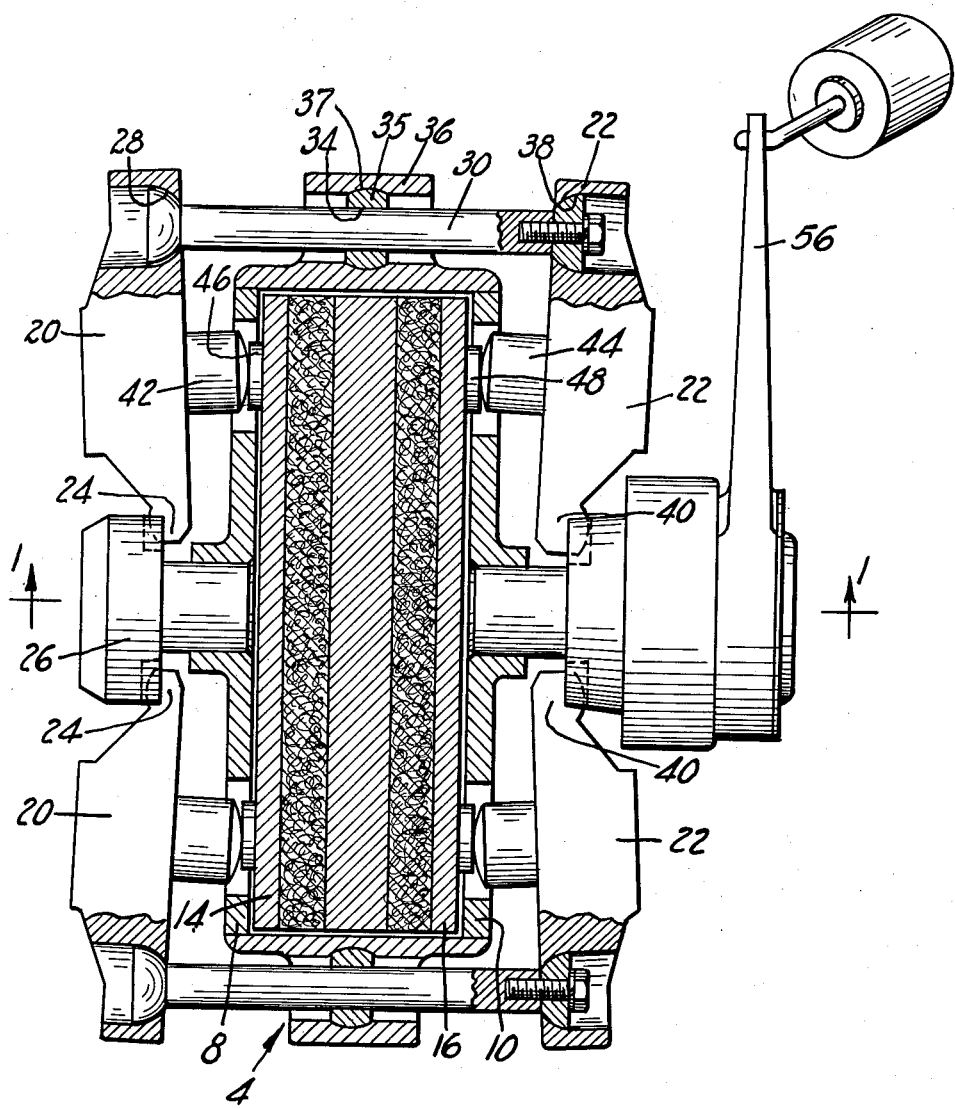

United States Patent Office 3,059,731
Patented Oct. 23, 1962

3,059,731
DISK BRAKES
Pierre Gancel, Levallois, and Etienne Servier, Pierrefitte, France, assignors to Societe Anonyme D.B.A., Paris, France, a company of France
Filed July 13, 1959, Ser. No. 826,722
10 Claims. (Cl. 188—73)

This invention relates to disk brakes, and more particularly to disk brakes of the type in which a pair of friction pads are adapted to be forced into engagement with opposite faces of a rotating disk, said wear pads extending over an angular portion only of the disk to provide for more efficient cooling of the brake.

Disk brakes of the above type, particularly of the hydraulically actuated "caliper" type, have been found to have advantages for use on passenger vehicles. But many shortcomings have appeared when attempts have been made to fit such brakes on heavy trucks or coaches, as the space available within the wheels has become insufficient to accommodate disk brakes having integral hydraulic cylinders. Moreover, as use of air pressure is steadily increasing on trucks due to adoption of pneumatic suspensions, pneumatic actuation of the brakes is to be preferred. But the bulky air motors should be located out of the wheels and connected to the brake operating mechanisms by linkages.

It is therefore an object of the invention to provide an improved heavy-duty disk brake of the above type for pneumatic over mechanical actuation.

A correlative object of the invention is to provide an operating mechanism for disk brakes of the above type which provides for satisfactory operation by an actuating lever.

Another object of the invention is to provide a disk brake wherein the applying forces are transmitted from the actuator to the friction pads by mechanical means constructed to balance the forces exerted on the pads and to accommodate unequal wear between the pads or between portions of a same pad without risk of jamming.

It is still another object of the invention to provide a disk brake of the above type having two friction pads applied by a linkage comprising one or a plurality of sets of rocking arms, each set having a rocking arm actuating the first pad and receiving an applying force from the actuator and a second rocking arm which fulcrums on a stationary member and is driven by a pull link connected to the first rocking arm.

It is a further object of the invention to provide a disk brake wherein the same geometry of the brake applying linkage is maintained throughout the wear life of the brake.

It is yet another object of the invention to provide a disk brake wherein the brake is actuated by a mechanism having camming means which translate rotating movement of a lever driven by the actuator into axial movement of a collar for application of the brake.

It is an important object of the invention to provide a disk brake wherein automatic wear compensating means are associated to the brake operating mechanism.

The invention resides in certain constructions and arrangements of the parts and further objects and advantages will become apparent to those skilled in the art from the following description of a preferred embodiment of the invention described with reference to the accompanying drawings which form a part of the specification.

In the drawings:

FIGURE 2 is a partial section taken substantially along the mean circumference of the disk (line 2—2 on FIGURE 1);

Figure 1:
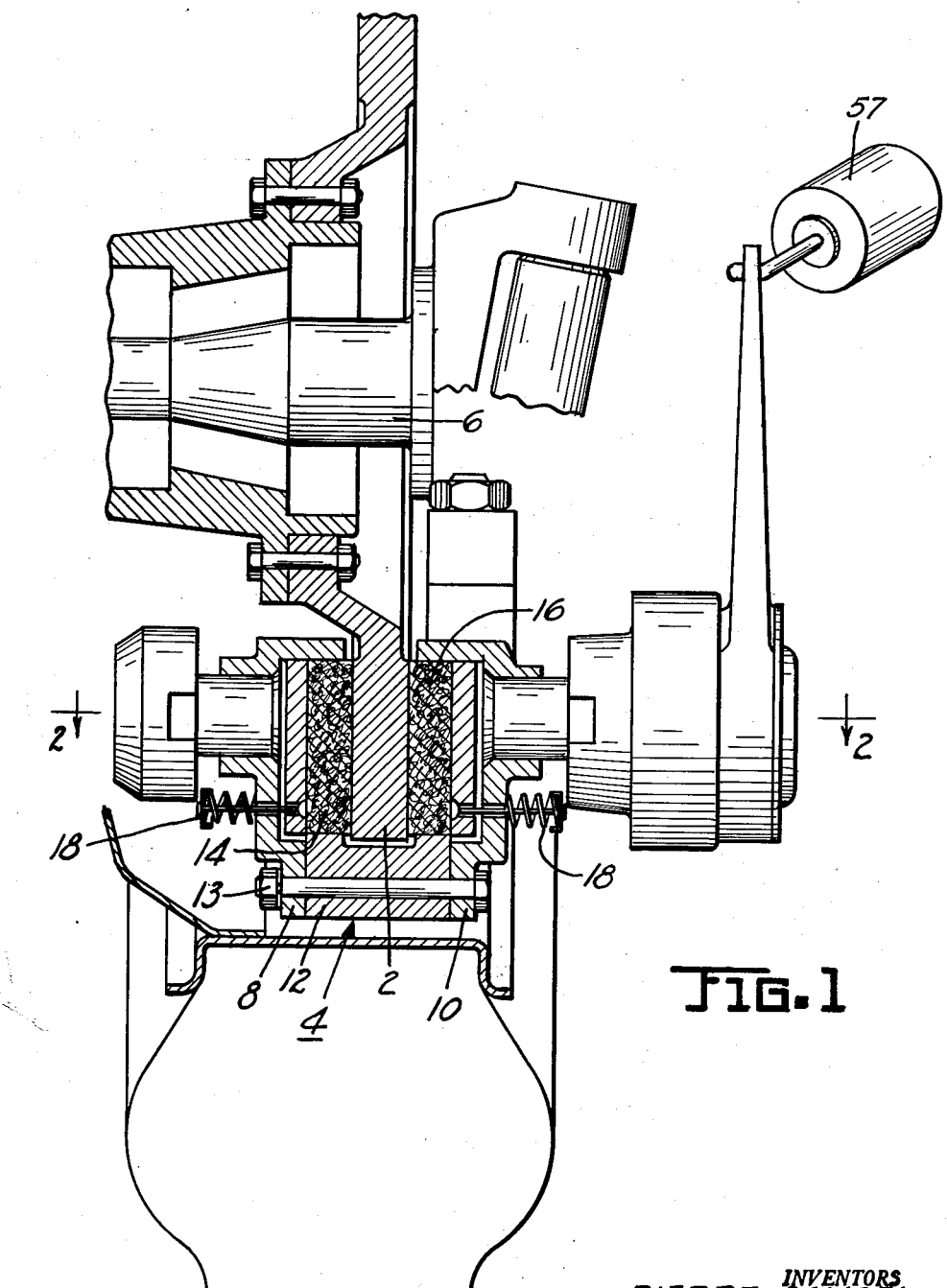
FIGURE 1 is an axial sectional view of a disk brake according to the invention.

Referring now to FIGURES 1 and 2, a rotating disk 2 is secured at its inner periphery to a rotatable part of a wheel to be braked. A stationary housing, designated generally by the reference numeral 4, is secured by bolts to a non-rotatable part of the vehicle wheel assembly, such as the swivel 6, and straddles the disk. The housing comprises two limb portions 8 and 10 interconnected by a bridge portion 12 secured thereto by appropriate means such as bolts 13. Each limb is formed with a recess slidably receiving one of the segmental friction pads 14 and 16 each of which is guided by recessed lateral surfaces in the limb portions 8 and 10 and by the bridge portion 12. As shown on FIGURE 1, the axial guiding surfaces terminate as closely as possible to the disk surfaces so as to prevent the tangential braking torque exerted by the rotating disk on each friction pad from wedging the friction pads within the recesses.

One or several pairs of return springs 18 are provided which bias the friction pads away from the disk and normally maintain them retracted from the disk by a distance in accordance with the geometry of the operating mechanism at rest.

The operating mechanism comprises an axial thrust applying device which receives its actuating force from a motor (not shown) and a force transmitting linkage. The latter may consist of one or several pairs of rocking arms 20 and 22, two pairs in the arrangement shown on FIGURE 2. The inner end 24 of each rocking arm 20 fulcrums on the bottom of a slot cut in a stationary member 26, which may be formed integrally with or press-shrunk into limb 8. The outer end of rocking arm 20 is formed with a machined recess whose hemispherical bottom 28 accommodates one of the rounded heads of a pull-link 30. The stem of the pull link 30 extends through a central passage having a diameter sufficient to provide for free oscillating movement of link 30 to the extent necessary for operation of the brake. The central portion of the link is slidably received through an opening 34 in a collar 35 whose external spherical surface 37 is received in a stationary lug 36 to form a ball and socket connection. The lug may be connected to one of the other parts of the housing or may be integral therewith.

The other head of the pull link 30 bears against the hemispherical bottom of a recess 38 formed in the other end of the second rocking arm 22 so that the link operatively connects the rocking arms. The inner end 40 of rocking arm 22 is driven by the force applying device which also operates as a stop member to determine the normal geometry of the force transmitting linkage.

The rocking arms 20 and 22 have symmetrical pins which project through openings in the limbs and engage contact buttons secured to the backing plates of the respective friction pads. It will be noted that the rocking arms are floatably mounted on the stationary member 26 and against the axial thrust applying device respectively, so that free deformation of the linkage geometry may be accommodate without any risk of jamming.

Figure 4:
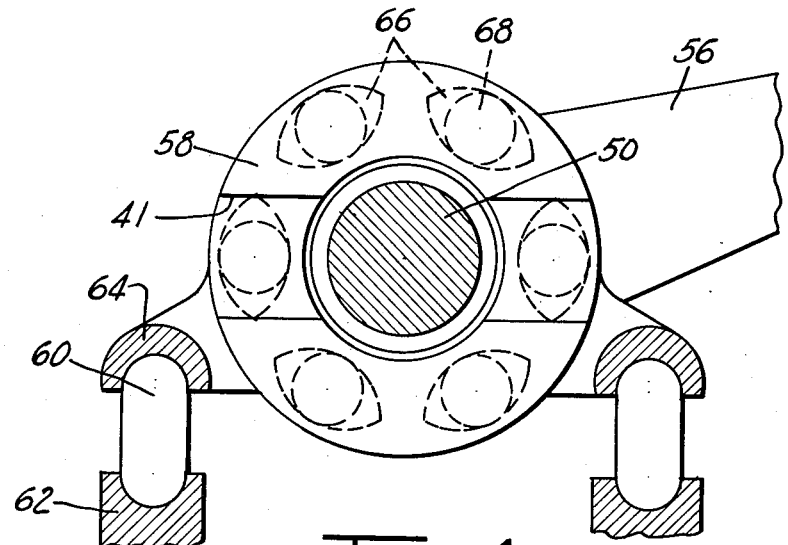
FIGURE 4 is an enlarged partial section, taken along line 4—4 of FIGURE 3, of the applying mechanism with the rocking arms removed.
Figure 3:
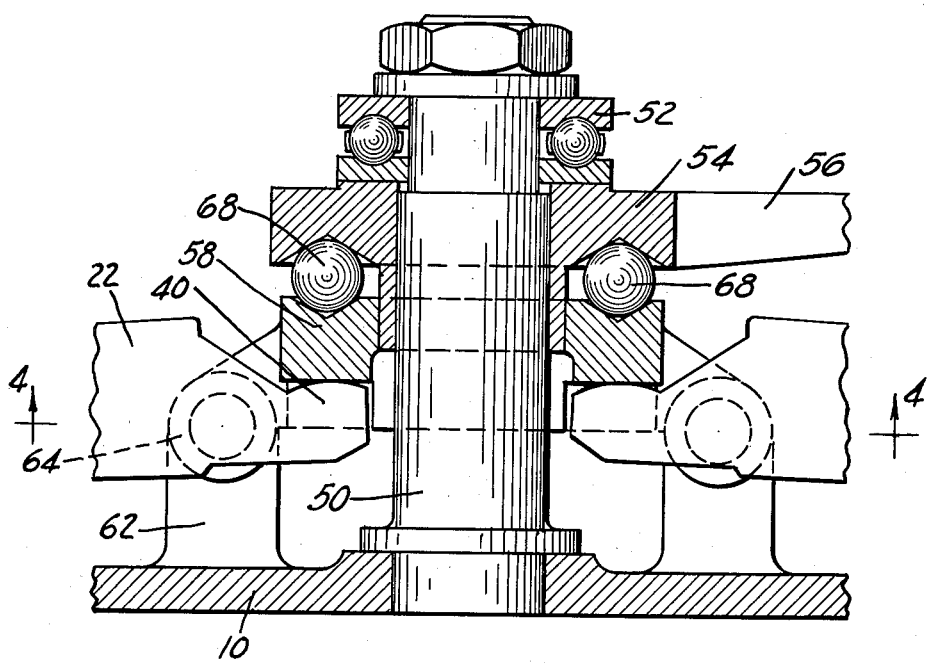
FIGURE 3 is a partial section, on an enlarged scale, of the applying mechanism shown on the right of FIGURE 2.

FIGURES 3 and 4 show a preferred but not exclusive embodiment of the axial force applying device: on a stationary shaft 50 press shrunk into limb 10, an end-thrust ball-bearing 52 rotatably supports a collar 54 formed with a lever 56 against axial movement. A second collar 58 confronting collar 54 is slidably mounted on shaft 50 but maintained against rotation by anchors shown in FIGURE 4 (one for each direction of rotation); each anchor comprises a short strut 60 having rounded ends and interconnecting an ear 62 of limb 10 to an extension 64 of collar 58. The collars 54 and 58 are provided with pairs of opposed conical recesses in which camming balls 68 are received.

It will be understood that angular movement of lever 56 will turn collar 54 with respect to collar 58 and will thus cause the collar 58 to be cammed away from the collar 54 retained by bearing 52. The collar 58 is notched to receive the lower ends 40 of the rocking arms 22 in slots 41, so that axial movement of the collar 58 from its normal position results in actuation of the transmitting linkage and brake application.

When the actuating motor is released, the return springs 18 urge the friction pads 14 and 16 clear of the disk. The return force exerted by the springs is transmitted from the friction pads to the rocking arms 20 and 22 by the pressure pins 42 and 44; the inner ends 24 and 40 of the rocking arms are then biased away from each other to the full extent allowed by the camming mechanism, which determines the normal brake clearance.

In operation, when lever 56 is rotated in either direction from its normal position, for instance by a fluid pressure motor 57, the balls 68 roll up their associated cams and force the collars 54 and 58 apart. The force exerted by collar 58 on the inner end of each rocking arm 22 causes it to rotate and to exert an applying force on friction pad 16 through pin 44 and a pull force on link 30; the link forces the other rocking arm to pivot about its stationary inner end 24 and to apply friction pad 14. Due to the symmetrical arrangement of the rocking arms, equal forces are exerted on the friction pads 14 and 16, said forces being higher than the axial force exerted by the collar 58 due to the mechanical advantage of the levers.

In operation, the geometry of the transmission linkage is slightly altered, but all the elements of the linkage are maintained coplanar by guiding means comprising the side faces of the inner ends of the rocking arms cooperating with the lateral surfaces of the slots, and the sliding ball-and-socket connection formed by collar 35 within lug 36. On brake application, each pair of interconnected rocking arms are rotated in the same direction (clockwise for the upper set and counterclockwise for the lower set of rocking arms in FIGURE 2) and the links 30 slide through openings in the bores of collars 35; collars 35 pivot with respect to the housing, which results in a sliding movement of the inner ends of the rocking arms on the bottom of their cooperating slots. If the pull links assume a non-symmetrical position with respect to the rocking arms there is produced a radial force tending to restore the link into a position where it is parallel to the disk axis.

When the applying force on lever 56 is released, the return springs 18, which were compressed by the slight displacement of the friction pads, return the parts to their normal positions.

Since the movable parts have universal connections, the brake can accommodate unequal wear either between different sections of the same friction pad or between the pads. However the possibility of unduly heating localized areas and thereby unequally wearing the pads is minimized by the provision made of several pairs of accurately guided applying arms.

In order that differences in the overall wear rate of a friction pad with respect to the other do not result in a permanent deformation of the linkage geometry, there may preferably be provided an automatic adjustor on each rocking arm. The adjustor shown on FIGURES 5–6 may be regarded as associated to the upper left arm 20 on FIGURE 2: In place of being integral with rocking arm 20, pin 42 is formed by a cylindrical pin having a threaded rear portion, a serrated portion 70 and a rounded end adapted to abut the contact button borne by the backing plate of the friction pad. The threaded portion of the pin is screwed in a corresponding passage of the rocking arm 20. A pawl 72, formed as a stamping, is carried on a pivot pin 73 secured to the arm and preferably located in the axial plane of pin 42. A turned back resilient end portion 74 of the pawl member engages the serrated portion 70 and operates as a one-way clutch. A spring 76 tensioned between the limb 8 and the pawl member 72 maintains the latter in abutting relation with a stop 78 which may be a stamping attached to the limb.

Figure 5:
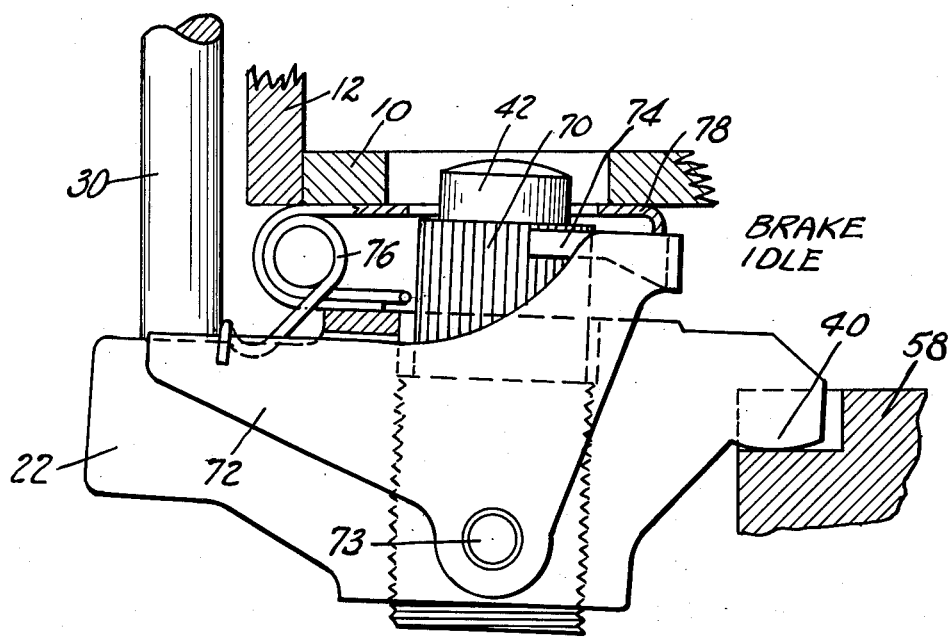
FIGURE 5 is a view of one of the wear compensating adjustors showing the parts in idle position.

Upon brake application (FIGURE 6) the rocking arm pivots about its end portion 24 and pivot pin 73 comes closer to the limb (FIG. 5). The stop 78 maintains the end portion of the pawl so as to cause the pawl to rotate counterclockwise about pivot pin 73 and to further tension spring 76. If the amount of rotation is in excess of a predetermined value, corresponding to a given clearance at rest, the turned back end portion 74 of the pawl snaps over a serration of the pin.

Figure 6:
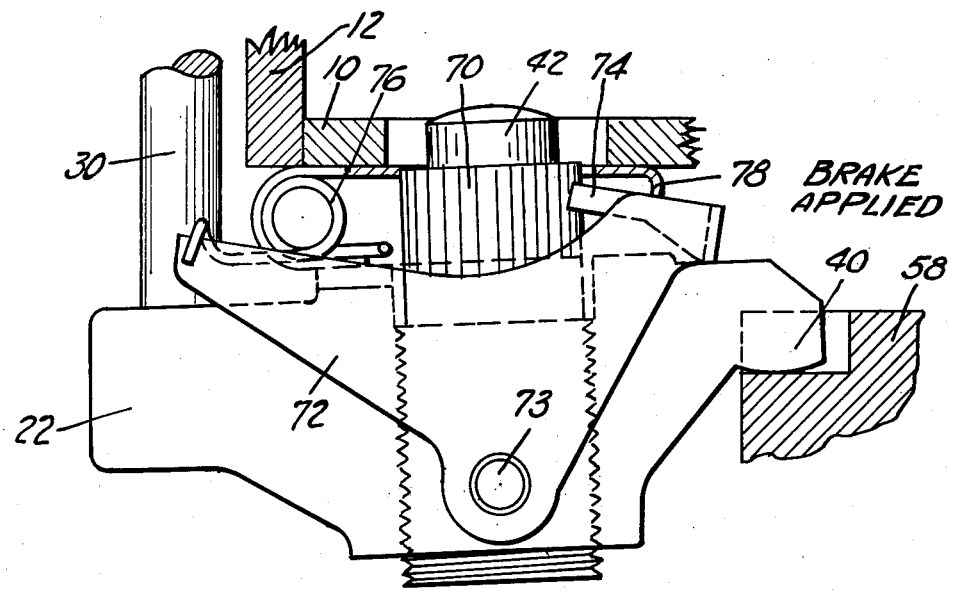
FIGURE 6 is a view similar to FIGURE 5 showing the parts in the position assumed during brake application.

When the brake applying force is released, spring 76 maintains pawl 72 in abutment against stop 78, while the pawl rotates clockwise and returns to the position of FIGURE 6. If the end portion 74 has previously snapped over one or several serrations of the pin, the pawl will rotate pin 42 upon its return stroke so as to establish the predetermined clearance, irrespective of lining wear.

Flat abutment takes place between the contact button 46 in the backing plate and pin 42, due to the rounded end of the latter, whatever the relative angular position of the rocking arm and friction pad may be. Even in the case of differential wear between localized areas of a friction pad, for instance if the lining takes a "wedge" wear pattern due to increased wear at the leading edge, no operating trouble can occur. The stabilizing forces acting on the linkage tend to give it a symmetrical geometry and prevent one of the adjustors of a same set to operate alone, which would result in an increasing dissymmetry as the lining wears: each adjustor will almost exactly compensate for the amount of wear of its associated friction pad in the area located in front of the adjustor.

Although this invention has been described in connection with a specific embodiment, it will be obvious to those skilled in the art that various changes may be made in the form, structure and arrangement of parts without departing from the spirit of the invention. For instance, any sliding or ball and socket connections may be replaced by pivotal connections, if a less failure-proof operation is deemed sufficient; the mechanism for applying an axial force to the transmitting linkage may be modified. It is our intention not to be limited to the specific embodiment disclosed for purposes of illustration.

We claim:
1. A disk brake comprising a brake rotor having opposed flat friction faces, a pair of axially movable oppositely acting friction members extending over only a portion of said faces, a non-rotatable housing having limbs on one each side of said rotor which provide anchoring surfaces for said friction members, means for applying said friction members against said friction faces, said means including at least one pair of rocking arms one on each side of said housing and abutting each friction member, means for mounting said rocking arms for pivotal movement in a plane transverse to the plane of said rotor and extending chordally of said rotor a force transmitting link having its opposed ends connected through universal movement connections to said rocking arms, means for slidably and pivotally mounting an intermediate portion of said link in said housing, one of said rocking arms fulcruming on said housing and the other on said force transmitting link, said rocking arms being proportioned to pro- vide substantially the same lever ratio effecting applying effort on said friction members.

2. A disk brake comprising a brake rotor having opposed flat friction faces, at least one pair of oppositely acting friction pads axially movable into engagement with said faces, a non-rotatable housing having limbs one on each side of said rotor for guiding said friction members, and means for applying said friction members against said rotor, said means including at least one pair of symmetrically mounted rocking arms each abutting one of said friction members, a force transmitting link interconnecting said rocking arms, one of the rocking arms of said one pair fulcruming on the housing and the other fulcruming on said forced transmitting link, a collar secured against rotation with respect to the housing and located to impart input force to said rocking arm fulcrumed on said transmitting link, a rotatable axially-fixed second collar, means for mounting said second collar for rotatable movement, camming means interposed between said first collar and said second collar and motor means for moving said second collar angularly effecting biasing effort thereof which actuates said first collar to impart said input force to said rocking arm.

3. A disk brake comprising a rotatable disk, a non-rotatable housing straddling said disk, a first disk-engaging friction member facing one side of said disk, first lever means floatably bearing on said housing and having an intermediate portion engaging said first friction member, a second disk-engaging friction member facing the other side of said disk, second lever means also having an intermediate portion engaging said second friction member and providing the same leverage ratio as said first lever means, a pull link interconnecting one end of said first lever means to one end of said second lever means, means for mounting said pull links for pivotal movement about the center thereof and actuating means operatively connected to said second lever means for applying force thereto, said housing providing means for anchoring said friction members and for slidably guiding said friction members toward and away from said rotor.

4. A disk brake comprising a rotating brake disk, a stationary housing extending over an angular portion of the disk, first and second friction members one located on each side of the disk, means axially guiding said friction members in said housing, stationary anchor means, actuating means adapted to exert an axial force when energized, and a force transmitting linkage including a plurality of identical lever sets circumferentially spaced along the housing, each set having a first rocking arm floatably abutting said actuating means and first friction member, a second rocking arm floatably abutting said stationary anchor means and second friction members, a force transmitting interconnecting link straddling a periphery of said disk and having universal connections with said rocking arms, and slidable rotatable guide means between said link and housing, said floatable connections between said arms and said actuating means and said guiding means cooperating to retain said set in a common plane.

5. A disk brake comprising a rotatable brake disk, a stationary housing extending circumferentially over an angular portion only of the disk, first and second friction members one located on each side of the disk, means axially guiding said friction members in said housing, brake actuating means comprising a force transmitting linkage including a plurality of identical sets of rocking arms spaced along the housing having thrust connections with said actuating means, each set having a first rocking arm axially driven by said actuating means and having an intermediate portion engaging one of said friction members, a pull-link straddling a periphery of the disk and connecting said first rocking arm to a second symmetrically mounted rocking arm, said second rocking arm fulcruming on the housing and having an intermediate portion engaging said second friction member whereby each rocking arm effects substantially equal applying effort on its friction member by movement of said rocking arms in a plane transverse to the plane of said disk.

6. A disk brake as set forth in claim 5 wherein an adjustable length means is received in each rocking arm and engages the corresponding friction member.

7. A disk brake as set forth in claim 6 wherein said adjustable length means comprises a member operatively connecting said rocking arm and friction member and having a threaded connection with said rocking arm which provides relative adjustable movement between said arm and its friction member to effect adjustment of said friction member responsively to turning movement of said extendible member, a serrated portion of said member which controls extension of said extendible member, a lever turnably mounted on said arm and engaging with said serrated portion and spring means fastened between said lever and said rocking arm, said spring serving to hold said lever against said housing and to develop a force to rotate the lever which turns said serrated portion upon return movement of the rocking arm to normal position after a brake application when the amount of movement of the rocking arm has been sufficient for said lever to engage a successive tooth of said serrated portion.

8. In a disk brake, a rotor having a flat friction face, a friction member engageable with said friction face, stationary means for axially guiding said member toward and away from said friction face, and brake actuating means comprising an applying mechanism having a rocking arm fulcruming on one end thereof and driven by said brake actuating means at the other end thereof, means mounting said rocking arm for free floating movement thereof, and in a plane transverse to the planes of said flat friction face and in a plane which extends chordally of said rotor, means received in said rocking arm and abutting said friction member, wear compensating means responsive to wear of the friction member for adjusting the length of said last means, said wear compensating means comprising a threaded pin threadedly received in said rocking arm and in abutting connection with said friction member, said threaded pin being longitudinally movable relatively to said rocking arm and thereby effecting degrees of adjustment of its abutting friction member, a serrated portion on said pin which controls rotation of said pin, a bell-crank lever turnably supported on said rocking arm above said pin, a spring stretched between an arm of the lever and the rocking arm thereby causing the lever to turn and thus rotate said serrated portion, the other arm of said lever engaging said serrated portion, said spring maintaining said other lever arm which engages the serrated portion in slidable abutting relation with a stationary stop member whereby movement of said rocking member away from a rest position produces a rotation of said lever and sliding movement of the end portion of said other lever arm to engage a successive tooth of said serrated portion, said spring serving to return the lever to its original position when the rocking arm is retracted and to rotate said serrated portion of the pin.

9. A disk brake comprising a brake rotor having opposed flat friction faces, a non-rotatable housing, a pair of friction members, means supporting said friction members in said housing for sliding movement into engagement with said brake rotor and means for applying said friction members against said friction faces, said last-named means including at least one pair of rocking arms, a force applying device, one end of one of said pair of rocking arms being fulcrumed on the housing and one end of the other of said pair being fulcrumed on said force applying device, force transmitting means between the other ends of said pair of rocking arms, extendable adjuster means carried by at least one of said rocking arms between its fulcrumed end and said other end and having force transmitting engagement with the corresponding friction member, and means for extending said adjuster means responsive to angular movement of said rocking arms in combination therewith to provide substantially constant running clearance between said friction members and their opposed surfaces of said rotor.

10. A disk brake having a rotor engageable by a pair of friction members, means for anchoring said friction members and for guiding said friction members toward and away from said rotor, an operating mechanism comprising at least two sets of rocking arms, said at least two sets having first and second rocking arms, each set having force transmitting means interconnecting the outer end portion of said rocking arms, means at the inner end of one of said rocking arms of each set for anchoring the same, means operatively connected with an intermediary portion of each rocking arm and engaging a corresponding friction member to provide a force application of substantially the same applying effort, and force applying means for directly axially moving the inner ends of the other of said rocking arms of each set and thereby concurrently actuating the rocking arms connected therewith through said force transmitting means and effecting substantially the same applying effort through each of said rocking arms on its associated friction member.

References Cited in the file of this patent

UNITED STATES PATENTS

| | | |
|---|---|---|
| 2,286,517 | Tack | June 16, 1942 |
| 2,669,327 | Chamberlain et al. | Feb. 16, 1954 |
| 2,790,516 | Wright et al. | Apr. 30, 1957 |
| 2,907,412 | Butler | Oct. 6, 1959 |

FOREIGN PATENTS

| | | |
|---|---|---|
| 729,859 | Great Britain | May 11, 1955 |